US008804616B2

(12) United States Patent
Grant et al.

(10) Patent No.: US 8,804,616 B2
(45) Date of Patent: Aug. 12, 2014

(54) SIGNALING MECHANISM FOR INTER-RAT CARRIER AGGREGATION

(75) Inventors: Stephen J. Grant, Pleasanton, CA (US); Stefan Parkvall, Stockholm (SE); Mats Fredrik Sågfors, Kyrkslätt (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 587 days.

(21) Appl. No.: 12/948,871

(22) Filed: Nov. 18, 2010

(65) Prior Publication Data

US 2011/0305193 A1 Dec. 15, 2011

Related U.S. Application Data

(60) Provisional application No. 61/354,770, filed on Jun. 15, 2010.

(51) Int. Cl.
*H04Q 7/00* (2006.01)

(52) U.S. Cl.
USPC ............ 370/328; 370/310; 370/329; 455/434

(58) Field of Classification Search
USPC ..................... 370/310, 328, 329; 455/434
See application file for complete search history.

(56) References Cited

U.S. PATENT DOCUMENTS

| | | |
|---|---|---|
| 2003/0223450 A1 | 12/2003 | Bender et al. |
| 2005/0210154 A1 | 9/2005 | Verma et al. |
| 2008/0200169 A1* | 8/2008 | Gao .............................. 455/434 |
| 2010/0128676 A1 | 5/2010 | Wu et al. |
| 2010/0202331 A1 | 8/2010 | Zhang et al. |
| 2011/0044218 A1* | 2/2011 | Kaur et al. .................... 370/310 |
| 2011/0268048 A1* | 11/2011 | Toskala et al. ................ 370/329 |

FOREIGN PATENT DOCUMENTS

WO 2009/113934 A1 9/2009

OTHER PUBLICATIONS

Wang, Y.-P. E., et al. "Management of Uplink Resources in Multi-Carrier CDMA System." Co-pending U.S. Appl. No. 12/537,148, filed Aug. 6, 2009.
3rd Generation Partnership Project. 3GPP TS 25.321, V9.2.0 (Mar. 2010). 3rd Generation Partnership Project; Technical Specification Group Radio Access Network; Medium Access Control (MAC) protocol specification (Release 9). Mar. 2010.
3rd Generation Partnership Project. 3GPP TS 25.401, V9.1.0 (Mar. 2010). 3rd Generation Partnership Project; Technical Specification Group Radio Access Network; UTRAN overall description (Release 9). Mar. 2010.

(Continued)

*Primary Examiner* — Wanda Z Russell
(74) *Attorney, Agent, or Firm* — Coats & Bennett, PLLC (57) ABSTRACT

A signaling mechanism informs a Radio Network Controller of the radio access technology associated with data packets forwarded to the Radio Network Controller from base stations supporting multiple radio access technologies. With this information, the Radio Network Controller can associate received data with the corresponding radio access technologies, and thus manage differing physical layer procedures, such as outer-loop power control, for the radio access technologies. In an example method, first and second data units transmitted by a mobile station over first and second radio access technologies, respectively, are forwarded from one or more base stations to a network control node for further processing. A control message associated with at least some of the data units is also sent to the network control node, the control message indicating the radio access technology over which the associated data units were transmitted.

17 Claims, 4 Drawing Sheets

(56) References Cited

OTHER PUBLICATIONS

3rd Generation Partnership Project. 3GPP TS 25.427, V9.0.0 (Dec. 2009). 3rd Generation Partnership Project; Technical Specification Group Radio Access Network; UTRAN Iub/Iur interface user plane protocol for DCH data streams (Release 9). Dec. 2009.

Furuskar, A. et al. "User-Plane Architecture for Inter-RAT Carrier Aggregation." Co-pending U.S. Appl. No. 61/354,771, filed Jun. 15, 2010.

Furuskar, A. et al. "Managing Secondary Radio Access Connection for Inter-Radio Access Carrier Aggregation." Co-pending U.S. Appl. No. 61/354,773, filed Jun. 15, 2010.

Grant, S. J. et al. "Control Signal Aggregation in a Multi-Carrier WCDMA System." Co-pending U.S. Appl. No. 12/614,526, filed Nov. 9, 2009.

* cited by examiner

SIGNALING MECHANISM FOR INTER-RAT CARRIER AGGREGATION

RELATED APPLICATION

This application claims priority under 35 U.S.C. §119(e) to U.S. provisional patent application Ser. No. 61/354,770, filed Jun. 15, 2010. The entire contents of the aforementioned provisional patent application are incorporated by reference herein.

TECHNICAL FIELD

The present invention relates generally to wireless communication systems and, more particularly, to signaling techniques for network control in wireless networks utilizing multiple radio access technologies.

BACKGROUND

The $3^{rd}$-Generation Partnership Project (3GPP) has developed specifications for a high-speed wireless packet data link based on Code-Division Multiple Access (CDMA) technology. Specifications for this so-called High-Speed Packet Access (HSPA) technology include support for both a high-speed downlink (High-Speed Downlink Packet Access, or HSDPA) and a high-speed uplink (known as Enhanced Uplink, EUL, or High-Speed Uplink Packet Access, HSUPA).

In the HSPA uplink as currently specified, data-to-control interference is a significant limitation. As one tries to increase data rates, the interference from the packet data channel (E-DCH) to control channels, e.g., DPCCH, RACH, etc. becomes significant. To permit reliable Random Access Channel (RACH) detection and to ensure adequate coverage, the rise-over-thermal (RoT) of the high-speed uplink must be maintained at a relatively low level. In addition, stability concerns for high data rates also require that RoT be maintained at low levels. The end result is that high uplink data rates are difficult to achieve in practice, since achieving high data rates requires that RoT be allowed to reach relatively high levels.

One way of to increase the uplink data rates available to a mobile station is to permit dual-carrier operation in the uplink. This is supported in Release 9 of 3GPP's HSPA standards. With this approach, the two HSPA carriers used by a mobile station can be configured so that the primary carrier carries all legacy traffic and the majority of control channels, thus allowing the supplementary carrier to carry only data-related channels. (Techniques for configuring HSPA carriers in this manner are described in U.S. patent application Ser. No. 12/614,526, filed Nov. 9, 2009, the entire contents of which are incorporated herein by reference.) However, while this allows higher RoT levels on the supplementary carrier, and thus a higher overall uplink data rate, performance is still limited, since it is difficult to eliminate all control channels from the supplementary carrier.

SUMMARY

Uplink data rates available to a mobile station can be improved by providing wireless systems that allow the aggregation of two or more carriers that use different radio access technologies (RATs). For example, one such system uses an HSPA carrier for the primary carrier and a Long-Term Evolution (LTE) carrier for the secondary carrier. Because LTE radio links do not suffer from data-to-control interference, this technique, referred to herein as inter-RAT aggregation, facilitates higher overall data rates compared to multi-carrier systems in which HSPA is used on all carriers.

However, physical layer control processes for the supported radio access technologies in a multi-RAT system may differ. In various embodiments of the present invention, then, a signaling mechanism is provided to inform a Radio Network Controller of the radio access technology associated with data packets forwarded to the Radio Network Controller from base stations supporting multiple radio access technologies. With this information, the Radio Network Controller can associate received data with the corresponding radio access technologies, and thus manage differing physical layer procedures, such as outer-loop power control, for the radio access technologies.

In an example method, first and second data units transmitted by a mobile station over first and second radio access technologies, respectively, are forwarded from one or more base stations to a network control node for further processing. A control message associated with at least some of the data units is also sent to the network control node, the control message indicating the radio access technology over which the associated data units were transmitted. In some embodiments, the first radio access technology is a Long-Term Evolution radio link (which does not use outer-loop power control) and the second radio access technology is a High-Speed Packet Access radio link (which does use outer-loop power control). Likewise, in some embodiments the network control node comprises a Radio Network Controller (RNC) in a Universal Mobile Telecommunications System (UMTS) network.

The further processing by the network control mode may include, for example, Automatic Repeat Request (ARQ) processing using retransmission information associated with the data units. In some embodiments, the control message comprises one or more bits in an E-DCH Uplink Data Frame carrying the one or more data units. In some of these embodiments, the control message comprises a predetermined value for an Uplink Multiplex Information (UL Mux Info) field in the E-DCH Uplink Data Frame.

In other embodiments, the control message comprises an N-bit binary mask, where N is the number of carriers in an inter-RAT carrier aggregation scheme and wherein each bit of the N-bit binary mask indicates a RAT type for a corresponding carrier. In still others, the control message may instead identify a particular carrier (e.g., by number) associated with the data units, in which case the network control node can associate the carrier with a particular radio access technology according to a pre-determined relationship.

In still other embodiments, the control message comprises a predetermined value for a Number-of-Retransmissions parameter, the predetermined value indicating that the associated one or more data units were transmitted over a particular radio access technology. In embodiments where the control message is included in an E-DCH Uplink Data Frame, this predetermined value may comprise a predetermined value for a Number-of-Retransmissions field in the E-DCH Uplink Data Frame. The presence of this predetermined value may indicate, for example, that the data units included in the E-DCH Uplink Data Frame were transmitted over an LTE radio link.

Methods carried out by a wireless network control node are also described, including an exemplary method in which first and second data units forwarded from one or more wireless base stations are received, where the first data units were transmitted by a mobile station using a first radio access technology and the second data units were transmitted by the mobile station using a second radio access technology that differs from the first. This method further includes receiving, from one of the wireless base stations, a control message associated with one or more of the first and second data units, and identifying, from the control message, the radio access technology over which the associated one or more data units were transmitted. In some embodiments, the method includes further processing that is based on the control message. In some embodiments, for instance, an outer-loop power-control parameter corresponding to one of the first and second radio access technologies is selectively adjusted, based on the control message.

The wireless network control node used to implement these methods may be, for example, a Radio Network Controller (RNC) in a Universal Mobile Telecommunications System (UMTS) network, and the control message may comprise a predetermined value for a Uplink Multiplex Information (UL Mux Info) field in an E-DCH Uplink Data Frame.

Alternatively, as suggested above, the control message in any of these embodiments may comprise an N-bit binary mask, where N is the number of carriers in an inter-RAT carrier aggregation for the mobile station and wherein each bit of the N-bit binary mask indicates a RAT type for a corresponding carrier, or the control message may otherwise identify a carrier associated with the data units that corresponds to a particular radio access technology according to a pre-determined relationship. In still other embodiments, the received control message includes a predetermined value for a Number-of-Retransmissions parameter, the predetermined value indicating that the associated one or more data units were transmitted over a particular radio access technology, such as an LTE radio link.

As noted above, in some embodiments the control message is used to determine whether or not to adjust an outer-loop power-control parameter corresponding to one of the first and second radio access technologies. In some cases, the outer-loop power-control parameter is adjusted according to a number of Hybrid-ARQ (HARQ) retransmissions indicated by the control message, unless the indicated number of HARQ retransmissions equals a predetermined value. In these embodiments, the presence of the predetermined value indicates that the associated one or more data units were transmitted over a radio access technology not subject to outer-loop power control.

Apparatus configured to carry out the methods summarized above are also described, including a wireless base station that includes a first radio unit configured to receive first data units transmitted by a mobile station using a first radio access technology and a MAC processing unit configured to, inter alia, communicate with a network control node. In these embodiments, the MAC processing unit is configured to receive the first data units from the first radio unit, forward the received first data units to a network control node for further processing, and send a control message associated with the first data units to the network control node, wherein the control message indicates the radio access technology over which the associated data units were transmitted. In some embodiments, the wireless base station includes a second radio unit configured to receive second data units transmitted by the mobile station using a second radio access technology that differs from the first, in which case the MAC processing unit is further configured to receive the second data units from the second radio unit and forward the received second data units to the network control node. In either case, the format and/or contents of the control message may be according to any of the techniques summarized above.

Similarly, various wireless network controllers are disclosed, including embodiments that include a base station interface unit configured to receive first and second data units forwarded from one or more wireless base stations, wherein the first data units were transmitted by a mobile station using a first radio access technology and the second data units were transmitted by the mobile station using a second radio access technology that differs from the first. These wireless network controllers also include a protocol processing unit configured to receive a control message associated with one or more of the first and second data units from one of the wireless base stations, via the base station interface unit, and to identify, from the control message, the radio access technology over which the associated one or more data units were transmitted. Again, the format and content of the control message may be according to any of the techniques described above. Likewise, various embodiments of these wireless network controllers may be further configured to carry out additional processing based on the control messages, such as the selective adjusting of an outer-loop power-control parameter mentioned above.

Of course, the present invention is not limited to the embodiments, contexts, and features summarized above, nor is it limited to the specific example embodiments detailed below. Instead, it will be understood that the present invention may be carried out in ways other than those specifically set forth herein without departing from essential characteristics of the invention as set forth in the appended claims. Upon reading the following description and viewing the attached drawings, the skilled practitioner will thus recognize that the described embodiments are illustrative and not restrictive, and that all changes coming within the scope of the appended claims are intended to be embraced therein.

DETAILED DESCRIPTION

As noted above, 3GPP's Release 9 standards for HSPA include specifications for dual-carrier operation in the uplink. Improvements in uplink data rates are limited, however, because each HSPA is sensitive to control-to-data interference, and it is difficult to remove all of the control channels from an HSPA carrier.

Uplink data rates available to a mobile station can be improved by providing wireless systems that allow the aggregation of two or more carriers that use different radio access technologies (RATs). One such system might use an HSPA carrier for the primary carrier and a Long-Term Evolution (LTE) carrier for the secondary carrier. Because LTE radio links do not suffer from data-to-control interference, this technique, referred to herein as inter-RAT aggregation, facilitates higher overall data rates compared to multi-carrier systems in which HSPA is used on all carriers.

However, physical layer control processes for the supported radio access technologies may differ. For instance, an HSPA uplink carrier is subject to outer-loop power control managed by a Radio Network Controller (RNC), while an LTE carrier is not. If data packets transmitted over both of these technologies are aggregated before being forwarded to the Radio Network Controller, then the RNC will be unable to properly maintain the outer-loop power control setpoints. Thus, in various embodiments of the present invention, a signaling mechanism is provided to inform an RNC of the radio access technology associated with data packets forwarded to the RNC Controller from base stations supporting multiple radio access technologies. With this information, the RNC is able to differentiate which data comes from HSPA and which data from LTE, so that the physical layer procedures for each may be controlled separately.

For example, in a very simple embodiment the signaling would indicate that a given data frame corresponds to "Carrier 1," known by the RNC to be an HSPA link, or "Carrier 2," known to be an LTE link. The RNC could then steer the outer-loop power control (OLPC) process using only information contained in the Carrier1/HSPA data frames.

This approach and the other approaches detailed herein can be easily extended to more than two carriers with HSPA and LTE applied to the carriers in various permutations. Furthermore, the techniques described herein are not limited to systems in which HSPA is used as the "master system," or even to systems that use HSPA and LTE at all. Thus, the specific embodiments described herein, in which techniques for distinguishing between HSPA and LTE are detailed, should be regarded as exemplary. Similar techniques may be applied to any aggregation of multiple radio access technologies, where upper layers need to know the technology over which all or some payload units (which also could be called data units, service units, or the like) have been transmitted and received.

Figure 1:
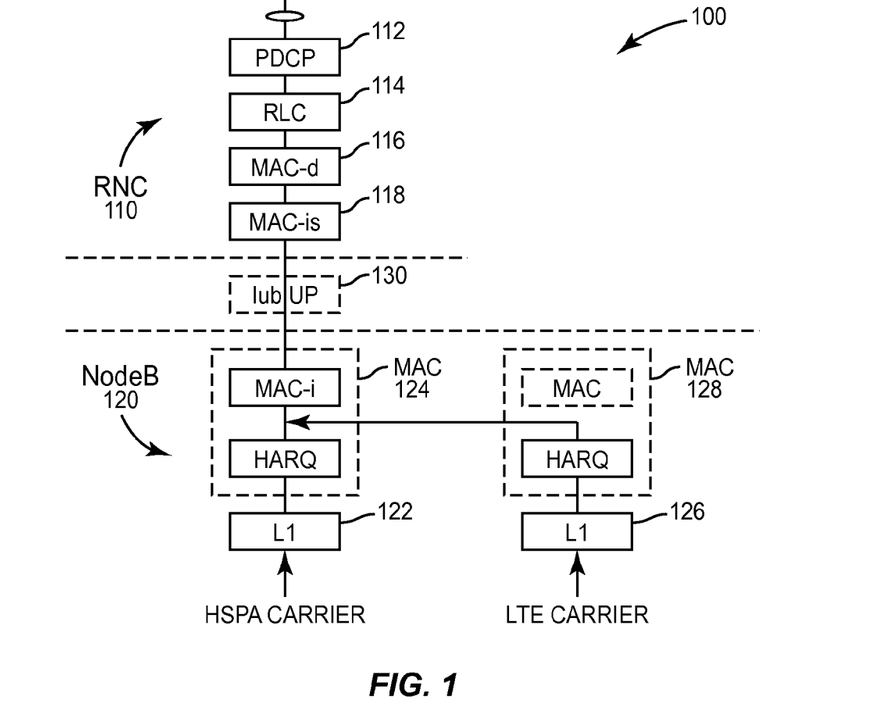
FIG. 1 illustrates functional elements of a wireless network utilizing aggregation of data transmitted over multiple radio access technologies.

FIG. 1 illustrates an example of how inter-RAT aggregation of two carriers can be achieved with HSPA acting as the "master" system. In this example, a wireless communication system 100 includes an RNC 110 and a NodeB 120. NodeB 120 is configured to support radio links over (at least) two carriers—one HSPA carrier and one LTE carrier. In the illustrated system, a single NodeB supports two differing radio links. In other systems, separate base stations may be used to provide the two radio links, with one of the base stations forwarding received data to the other base station for aggregation. Other configurations are also possible, such as systems in which base stations supporting different RATs separately forward received data to the RNC.

In any case, MAC-i/is protocol data units (PDUs) are generated at a mobile station (not shown in FIG. 1) and transmitted to one or more base stations over two (or more) different radio access technologies. In the pictured example a first radio access technology corresponds to the HSPA carrier and a second to the LTE carrier. The MAC-i/is PDUs are thus processed by separate physical layers for the two radio access technologies. Physical layer 122 (designated L1, for "layer 1") processes the HSPA carrier transmitted by the mobile station, while physical layer 126 processes the received LTE carrier.

NodeB 120 also includes distinct Medium Access Control (MAC)-layer processing for each of the two radio access technologies; this is shown at MAC unit 124 and MAC unit 128 in FIG. 1, corresponding to the HSPA carrier and LTE carrier, respectively. MAC-layer error detection and correction processes operate independently for each of the radio access technologies. Accordingly, FIG. 1 illustrates separate Hybrid Automatic Repeat Request (HARQ) processes in MAC 124 and MAC 128.

In the illustrated system, once a packet data unit is successfully decoded in the MAC unit 128 for the LTE carrier, the corresponding MAC-i/is PDUs is forwarded to the MAC unit 124 for the "master" (HSPA) system. It is at this point that the PDUs from the two different carriers are aggregated at the receiving side. The aggregated MAC-i/is PDUs are then transmitted from the NodeB 120 to the RNC over the Iub interface 130. In the RNC 110, the MAC-is PDUs are then further processed, at MAC-is layer 118 and MAC-d layer 116, for delivery to higher layers.

In the pictured system, data units produced by the MAC-d layer 116 are then processed at the Radio Link Control layer 114, which supports, among other things, selective-repeat ARQ and encryption of user-plane data. It will be appreciated by those familiar with HSPA systems that the MAC-i, MAC-is, and MAC-d entities are specific to the HSPA standards. Because the details of these entities are not necessary to a full understanding of the present techniques, those details, which may be found in the Release 9 specifications for HSPA, are not provided here.

Figure 2:
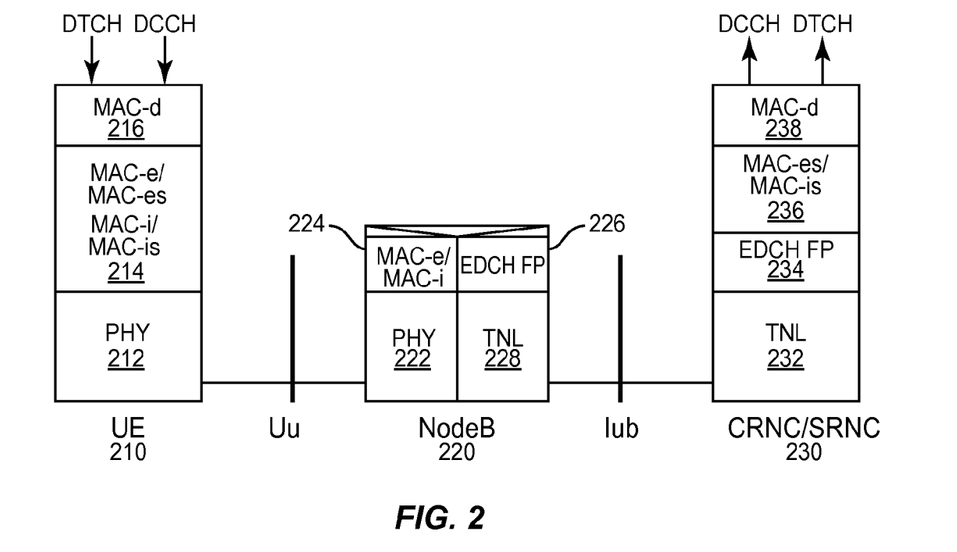
FIG. 2 illustrates protocol stacks for a mobile terminal, a wireless base station (NodeB), and a Radio Network Controller in an example wireless network.

In a conventional HSPA system (i.e., a system that does not support inter-RAT aggregation), the E-DCH Frame Protocol (FP) is used to handle the transmission of MAC-i/is PDUs over the Iub interface. FIG. 2 illustrates a portion of the HSPA protocol stacks at the mobile station 210 (known in 3GPP parlance as "user equipment," or UE), NodeB 220, and RNC 230. In particular, FIG. 2 shows where in the protocol stack the FP exists at the NodeB 220 and RNC 230. As shown in FIG. 2, data to be transmitted by UE 210 is processed by MAC-d entity 216 and a MAC layer 214 that includes MAC-i/is and MAC-e/es processing. (Again, the details of the HSPA-specific MAC-d, MAC-i/is, and MAC-e/es entities are not needed to understand the present invention.) The resulting PDU is then processed by physical layer 212 and transmitted to NodeB 220 over the air interface, which is denoted by the Uu reference point in FIG. 2. The received signal is processed by physical layer 222 and MAC layer 224 at NodeB 220, and then packaged into an E-DCH UL data frame by EDCH FP unit 226, for transmission to RNC 230 by Transport Network Layer 228, over the Iub interface. At the RNC 230, the E-DCH UL data frame is received by TNL 232 and then unpacked by EDCH FP layer 234, before processing of the MAC PDUs by MAC-es/is entity 236 and MAC-d entity 238.

Figure 3:
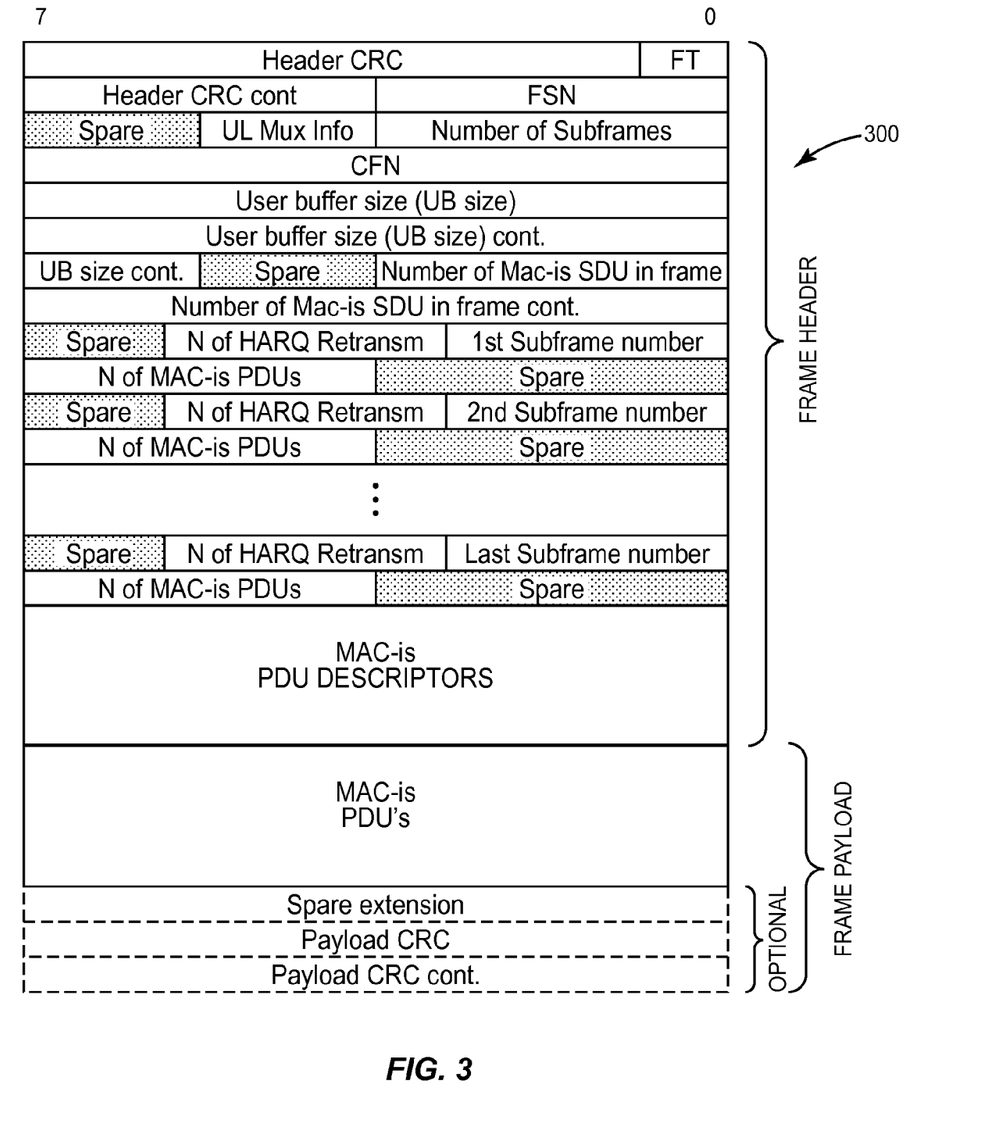
FIG. 3 illustrates the contents of an E-DCH UL Data Frame, which may be used to carry control messages according to several embodiments of the present invention.

FIG. 3 shows the structure of an E-DCH UL Data Frame 300 for carrying the MAC-i/is PDUs over the Iub interface between the NodeB 220 and RNC 230. In the current standard, the E-DCH UL Data Frame is transmitted over the Iub interface under two conditions: first, if a codeword is successfully decoded, or second, if a HARQ failure is declared. The latter occurs when the NodeB 220 determines that the number of HARQ transmissions has exceeded a maximum value. In the first case, i.e., when a packet data unit is successfully decoded, the E-DCH data frame shown in FIG. 3 contains a payload of a given number of MAC-is PDUs. In the latter case, i.e., when a HARQ failure occurs, the E-DCH Data Frame carries no payload. In both cases, the number of HARQ retransmissions is indicated.

In response to the number of HARQ retransmissions, an outer-loop power-control (OLPC) function located in the RNC commands the NodeB to increase or decrease the signal-to-interference ratio (SIR) target used in an inner-loop power-control procedure performed by the NodeB. Generally, if the number of HARQ retransmissions is above a target level, the OLPC function in the RNC increases the SIR target so that the inner-loop power-control function in the NodeB will act to increase the UE's transmit power to achieve the new SIR target and potentially reduce the number of retransmissions. Conversely, if the number of HARQ retransmissions is below the target level, the OLPC function lowers the SIR target, so that the inner-loop power control will act to decrease the UE's transmit power to achieve the new SIR target, thereby increasing the number of HARQ retransmissions.

Considering FIGS. 1 and 2 together, it is apparent that LTE PDUs can be supplied to the MAC-i entity 224 in NodeB 220, for packaging by EDCH FP unit 226 and forwarding to RNC 230. However, one issue with this approach, and with the inter-RAT aggregation approach in general, is that the different RATs associated with the different carriers may have different physical layer procedures. For example HSPA employs outer-loop power control (OLPC), whereas LTE does not. Another difference is that macro-diversity is supported in HSPA but not in LTE.

A problem arises here because the RNC is not aware of which RAT was used to receive a particular MAC-i/is payload received by the RNC over the Iub interface. This information is required in order for the RNC to control physical layer procedures on a RAT-specific basis. In particular, as discussed above, the RNC is in control of the outer-loop power control of the WCDMA (HSPA) channels. As a result, the RNC needs input from the NodeB to properly steer the OLPC.

To address this problem, a flag or other control message may be included within each data frame transmitted over the Iub interface between the Node B and RNC. This control message indicates which RAT and/or which carrier was used to transmit the data carried by the data frame. There are a number of possible approaches to transmitting this control message. For instance a carrier mask might be used, in some embodiments, in which case the control message comprises an N-bit binary mask, where N is the number of carriers in the inter-RAT carrier aggregation configuration. The n-th bit of the mask indicates the RAT type corresponding to the n-th carrier. For example, 0 could indicate HSPA and 1 could indicate LTE. Thus, a 0 in the first position would indicate that the first carrier is an HSPA carrier, in this example.

In some cases, it may not be necessary for the control message to explicitly specify which carriers are HSPA and which ones are LTE. For example, in a dual-carrier system it may be known a priori that carrier 1 is HSPA and carrier 2 is LTE. In this case a 1-bit flag is sufficient to indicate the RAT type corresponding to particular packet data units.

In the event that a UTRAN RNC is used, either of the preceding approaches could be realized with small modifications to the existing E-DCH Uplink Data Frame structure, as pictured in FIG. 3. For instance, the new flag could occupy one of the areas currently designated as "Spare."

Other possible approaches are based on extending the meaning of an existing field in the E-DCH Uplink Data Frame structure to indicate RAT type. For instance, the UL Multiplexing Information field in the E-DCH Uplink Data Frame 300 may be used. This is a 2-bit field, shown as "UL Mux Info" in FIG. 3. As of version 9 of the standard defining this field (3GPP TS 25.427, "UTRAN Iur/Iub Interface User Plane Protocol for DCH Data Streams," v. 9.0.0, January 2010, p. 30), the values 0 and 1 indicate primary and secondary frequency in the case of Multi-Cell E-DCH operation. The value 3 or 4 could be employed to indicate HSPA or LTE, respectively.

Another field of the E-DCH Uplink Data Frame 300 that might be used is the "Number of HARQ Retransmissions" field. This is a 4-bit field labeled "N of HARQ Retransm" in FIG. 3. There is one such field for each one of the Layer 1 subframes carried in the E-DCH Data Frame. The value 14 (unused in the current revision of the standard) could be employed to indicate LTE in an inter-RAT aggregation scenario. For HSPA, the current allowed values of the field would be used without modification.

This approach would work particularly well for the purposes of outer-loop power control. The RNC can be configured so that if the number of HARQ retransmissions is set to 14, it should not attempt to trigger the OLPC, since there is no such functionality for LTE. For any other allowed value, the OLPC would be triggered for the HSPA carrier based on the number of retransmissions indicated by the field.

It will be appreciated that the above techniques represent an approach to signaling RAT type over the Iub interface that is easy to implement. Furthermore, this approach is easy to introduce into the relevant standards since, for example, only minor modifications to the E-DCH UL Data Frame structure in the HSPA standards. It will also be appreciated that these techniques may be readily adapted to other systems and standards, including multi-carrier, multi-RAT systems that do not use HSPA.

Figure 4:
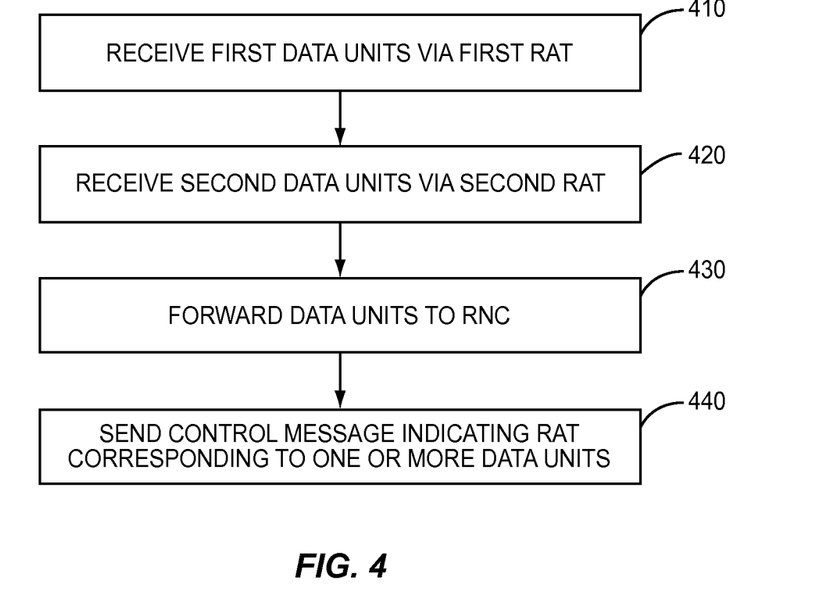
FIG. 4 is a process flow diagram illustrating a method for signaling radio access technology information to a network control node.
Figure 5:
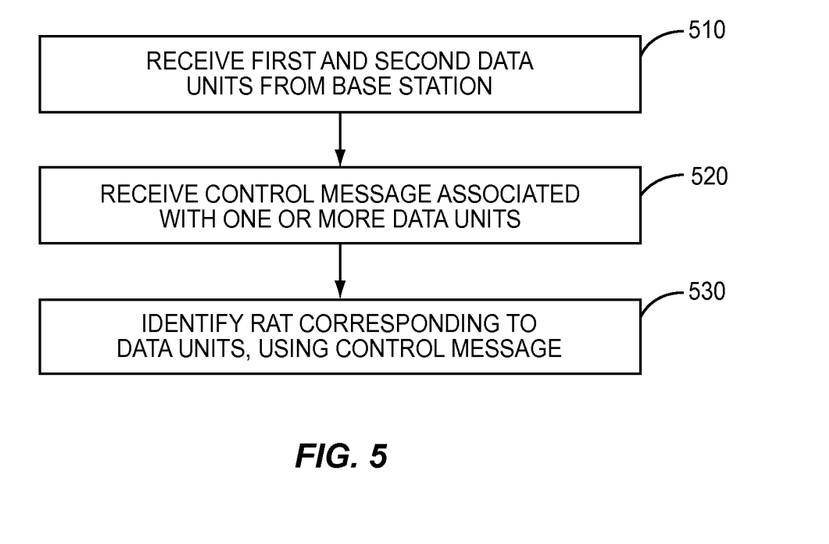
FIG. 5 is another process flow diagram, illustrating a method for receiving and processing a control message sent to a network control node

Accordingly, FIGS. 4 and 5 are process flow diagrams illustrating generalized procedures for signaling RAT-related information and processing that information. The procedure illustrated in FIG. 4 may be implemented at one or more base stations, for example, such as a base station configured to support simultaneous communications with mobile terminals over both HSPA and LTE carriers. The procedure illustrated in FIG. 5, on the other hand, may be implemented at a network control node, such as the UTRAN RNC discussed earlier.

FIG. 4 begins, as shown at block 410, with the receiving of first data units at a base station, via a first radio access technology. (Unless the context specifically indicates otherwise, the terms "first" and "second" are used herein simply to distinguish between separate instances of an item, and are not intended to connote a particular order.) As shown at block 420, second data units are also received via a second radio access technology. The second data units may be received simultaneously with the first, or shortly before or after the first are received. The second data units may be received at the same base station as the first, in the event that a single base station supports both RATs, or may be forwarded from a separate base station. As suggested earlier, the first and second RATs may be HSPA and LTE, although other technologies may be used.

As shown at block 430, the first and second data units are forwarded to a network control node. As suggested by FIG. 4, this network control node may be a Radio Network Controller, as specified by 3GPP. However, other network control nodes may be used in some embodiments.

In addition to the data units, a control message is also sent to the network control node, as shown at block 440. This control message indicates, either directly or indirectly, the radio access technology corresponding to one or more of the data units that were forwarded to the network control node. The control message may take any of several forms, including those discussed above. For instance, the control message may comprise one or more bits in an E-DCH Uplink Data Frame carrying the associated data units. In this case, the control message may signal that a particular RAT type was used by sending a predetermined value for a particular field in the E-DCH Uplink Data Frame, such as the Uplink Multiplex Information field or the Number of HARQ Retransmissions field. A given predetermined value might indicate, for example, that the data units were transmitted over an LTE link. In some embodiments, the control message comprises an N-bit binary mask, where N is the number of carriers in an inter-RAT carrier aggregation scheme and wherein each bit of the N-bit binary mask indicates a RAT type for a corresponding carrier. In other embodiments, a simpler control message that indicates a particular radio access technology according to a pre-determined relationship may be used.

FIG. 5 shows a process implemented at a network control node, corresponding to the process of FIG. 4. As shown at blocks 510 and 520 of FIG. 5, the first and second data units and the control message associated with one or more of the data units are received at the network control node. As shown at block 530, the control message is used to identify the radio access technology used to transmit the associated one or more data units.

In some embodiments, the information gleaned from the control message is used to adjust one or more control processes. For instance, the control message may be used to distinguish between data units sent over a link subject to outer-loop power control (such as an HSPA link) and those sent over a link that is not (such as LTE). In such embodiments, the control message may be used to determine whether or not to adjust an outer-loop power-control parameter (such as an SIR target). For instance, in some embodiments the outer-loop power-control parameter is adjusted according to an indicated number of HARQ retransmissions (e.g., according to the "Number of HARQ Retransmissions" field in an E-DCH UL Data Frame), unless the indicated number of HARQ retransmissions equals a predetermined value. In these embodiments, the predetermined value indicates that the associated data units were transmitted over a radio access technology not subject to outer-loop power control.

Figure 6:
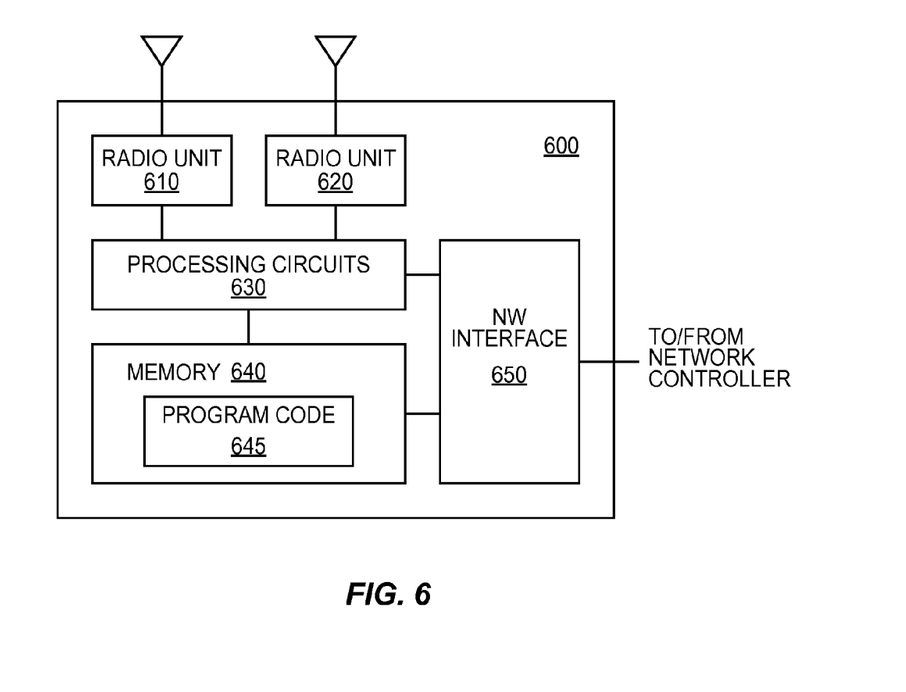
FIG. 6 is a block diagram illustrating components of a base station configured according to some embodiments of the present invention.
Figure 7:
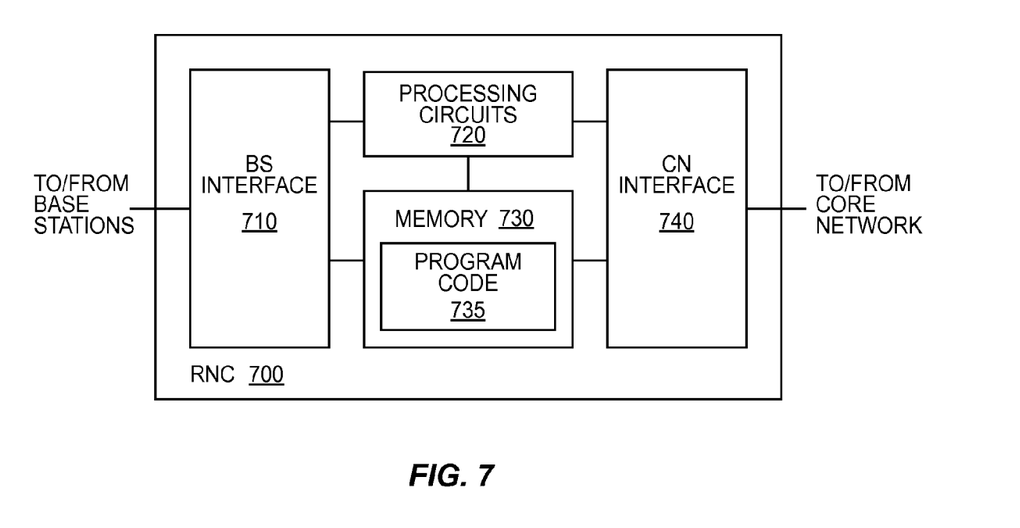
FIG. 7 is a block diagram illustrating components of a network control node configured according to some embodiments of the present invention.

Those skilled in the art will appreciate that the various methods and processes described herein may be implemented using various hardware configurations, generally (but not necessarily) including the use of one or more microprocessors, microcontrollers, digital signal processors, or the like, coupled to memory storing software instructions for carrying out the techniques described herein. FIGS. 6 and 7 illustrate block diagrams for an example radio base station 600 and an example network control node 700, respectively. Of course, configurations other than those pictured are possible.

Referring to FIG. 6, base station 600 comprises two separate transceivers, radio unit 610 and radio unit 620. These radio units are configured to communicate with mobile stations via different radio access technologies. For instance, radio unit 610 may comprise an HSPA transceiver, while radio unit 620 may comprise an LTE transceiver. Detailed designs for each of these types of transceiver are well known.

Radio units 610 and 620 are operatively connected to processing circuits 630, which control the radio units and which relay user data and control data to and from the network controller, via network interface 650. Processing circuits 630 may comprise one or more microprocessors, configured with program code 645 stored in memory 640. Program code 645 may include, in some embodiments, instructions for carrying out one or more of the techniques described above for forwarding data units to the network controller and for sending control messages indicating the radio access technology type associated with one or more of those data units.

FIG. 7 illustrates the basic configuration of an example network control node 700. Network control node 700 comprises a base station interface 710 for communicating with one or more remote base stations. This communication may be over the Iub interface, for example, in a UTRAN system. Base station 700 also comprises a core network interface 740, for communicating with the rest of the fixed network, e.g., over the IuCS and IuPS interfaces defined by 3GPP.

Network control node 700 further comprises processing circuits 720 and memory 730. Processing circuits 720 may comprise one or more microprocessors configured to execute program code 735, which comprises instructions for carrying out one or more of the techniques described above for receiving data units and control messages and for determining a radio access technology type associated with one or more of the data units.

The design and cost tradeoffs for the various hardware approaches, which may depend on system-level requirements that are outside the scope of the present disclosure, are well known to those of ordinary skill in the art, and are not necessary to a full understanding of the presently disclosed techniques. Accordingly further details of specific hardware implementation are not disclosed herein.

Furthermore, those skilled in the art will appreciate that the circuits of base station 600 and network control node 700 may be configured in ways that vary in certain details from the broad descriptions given above. For instance, one or more of the signal processing and control functionalities discussed above may be implemented using dedicated hardware, rather than a microprocessor configured with program instructions. Such variations, and the engineering tradeoffs associated with each, will be readily appreciated by the skilled practitioner. Indeed, all of the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method for wireless communications, comprising:
  receiving, at one or more wireless base stations in a wireless communication network, first data units transmitted by a mobile station using a first radio access technology and second data units transmitted by the mobile station using a second radio access technology that differs from the first;
  forwarding the received first and second data units from the wireless base stations to a network control node for further processing; and
  sending a control message associated with one or more of the first and second data units to the network control node, from one of the wireless base stations, wherein the control message indicates the radio access technology over which the associated one or more data units were transmitted, wherein the control message comprises an N-bit binary mask, where N is the number of carriers in an inter-RAT carrier aggregation scheme and wherein each bit of the N-bit binary mask indicates a RAT type for a corresponding carrier.

2. The method of claim 1, wherein the first radio access technology is a Long-Term Evolution radio link and the second radio access technology is a High-Speed Packet Access radio link.

3. The method of claim 1, wherein the network control node comprises a Radio Network Controller (RNC) in a Universal Mobile Telecommunications System (UMTS) network.

4. The method of claim 3, wherein the control message comprises one or more bits in an E-DCH Uplink Data Frame carrying the one or more data units.

5. The method of claim 1, wherein the control message identifies a carrier that corresponds to a particular radio access technology according to a pre-determined relationship.

6. The method of claim 1, wherein the further processing comprises Automatic Repeat Request (ARQ) processing.

7. A method in a wireless network control node, the method comprising:
  receiving first and second data units forwarded from one or more wireless base stations, wherein the first data units were transmitted by a mobile station using a first radio access technology and the second data units were transmitted by the mobile station using a second radio access technology that differs from the first;
  receiving, from one of the wireless base stations, a control message associated with one or more of the first and second data units, wherein the control message comprises an N-bit binary mask, where N is the number of carriers in an inter-RAT carrier aggregation for the mobile station and wherein each bit of the N-bit binary mask indicates a RAT type for a corresponding carrier; and
  identifying, from the control message, the radio access technology over which the associated one or more data units were transmitted.

8. The method of claim 7, wherein the wireless network control node comprises a Radio Network Controller (RNC) in a Universal Mobile Telecommunications System (UMTS) network.

9. The method of claim 7, wherein the control message identifies a carrier that corresponds to a particular radio access technology according to a pre-determined relationship.

10. The method of claim 7, further comprising selectively adjusting or not adjusting an outer-loop power-control parameter corresponding to one of the first and second radio access technologies, based on the control message.

11. A wireless base station, comprising
  a first radio unit configured to receive first data units transmitted by a mobile station using a first radio access technology; and
  a MAC processing unit configured to:
    receive the first data units from the first radio unit;
    forward the received first data units to a network control node for further processing; and
    send a control message associated with the first data units to the network control node, wherein the control message indicates the radio access technology over which the associated data units were transmitted, wherein the control message comprises an N-bit binary mask, where N is the number of carriers in an inter-RAT carrier aggregation scheme wherein each bit of the N-bit binary mask indicates a radio access technology type for a corresponding carrier.

12. The wireless base station of claim 11, further comprising a second radio unit configured to receive second data units transmitted by the mobile station using a second radio access technology that differs from the first, wherein the MAC processing unit is further configured to receive the second data units from the second radio unit and forward the received second data units to the network control node.

13. The wireless base station of claim 11, wherein the network control node comprises a Radio Network Controller (RNC) in a Universal Mobile Telecommunications System (UMTS) network, and wherein the control message comprises one or more bits in an E-DCH Uplink Data Frame carrying the one or more data units.

14. The wireless base station of claim 11, wherein the control message identifies a carrier that corresponds to a particular radio access technology according to a pre-determined relationship.

15. A wireless network controller, comprising:
  a base station interface unit configured to receive first and second data units forwarded from one or more wireless base stations, wherein the first data units were transmitted by a mobile station using a first radio access technology and the second data units were transmitted by the mobile station using a second radio access technology that differs from the first; and
  a protocol processing unit configured to:
    receive a control message associated with one or more of the first and second data units from one of the wireless base stations, via the base station interface unit, wherein the control message comprises an N-bit binary mask, where N is the number of carriers in an inter-RAT carrier aggregation for the mobile station and wherein each bit of the N-bit binary mask indicates a RAT type for a corresponding carrier; and
    identify, from the control message, the radio access technology over which the associated one or more data units were transmitted.

16. The wireless network controller of claim 15, wherein the control message identifies a carrier that corresponds to a particular radio access technology according to a pre-determined relationship.

17. The wireless network controller of claim 15, wherein the protocol processing unit is further configured to selectively adjust or not adjust an outer-loop power-control parameter corresponding to one of the first and second radio access technologies, based on the control message.

* * * * *